(12) United States Patent
Nieuwenhuizen

(10) Patent No.: US 11,754,041 B2
(45) Date of Patent: Sep. 12, 2023

(54) QUICK ADAPTATION OF WIND TURBINE BLADE FLOW REGULATION

(71) Applicant: Siemens Gamesa Renewable Energy A/S, Brande (DK)

(72) Inventor: John Nieuwenhuizen, Horsens (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 3 days.

(21) Appl. No.: 17/297,479

(22) PCT Filed: Oct. 23, 2019

(86) PCT No.: PCT/EP2019/078924
§ 371 (c)(1),
(2) Date: May 27, 2021

(87) PCT Pub. No.: WO2020/119991
PCT Pub. Date: Jun. 18, 2020

(65) Prior Publication Data
US 2022/0003207 A1    Jan. 6, 2022

(30) Foreign Application Priority Data

Dec. 13, 2018 (EP) .................................. 18212400

(51) Int. Cl.
*F03D 7/02* (2006.01)
*F03D 1/06* (2006.01)
(52) U.S. Cl.
CPC ......... *F03D 7/0232* (2013.01); *F03D 1/0633* (2013.01); *F05B 2240/3052* (2020.08)

(58) Field of Classification Search
None
See application file for complete search history.

(56) References Cited

U.S. PATENT DOCUMENTS

| 5,106,265 A | 4/1992 | Holzem | |
| 8,157,533 B2* | 4/2012 | Godsk | F03D 1/0641 416/240 |
| 8,616,846 B2* | 12/2013 | Nanukuttan | F03D 1/0633 416/231 A |
| 8,851,840 B2 | 10/2014 | Hancock et al. | |
| 11,274,649 B2* | 3/2022 | Akay | F03D 1/0633 |

(Continued)

FOREIGN PATENT DOCUMENTS

| EP | 1 623 111 B1 | 9/2008 |
| EP | 2548798 A2 | 1/2013 |

(Continued)

OTHER PUBLICATIONS

International Search Report and Written Opinion for PCT/EP2019/078924 dated Feb. 12, 2020.

*Primary Examiner* — Kayla McCaffrey
(74) *Attorney, Agent, or Firm* — Schmeiser, Olsen & Watts LLP

(57) ABSTRACT

Provided is an arrangement for releasing fluid from a deformable container adapted to modify a state of an adaptable flow regulating device of a wind turbine rotor blade, the arrangement including: a valve connectable to the container; an exhaust tube connected to the valve, wherein the valve is adjustable to allow fluid communication between a lumen of the container and a lumen of the exhaust tube.

12 Claims, 1 Drawing Sheet

(56) References Cited

U.S. PATENT DOCUMENTS

Figure 1:
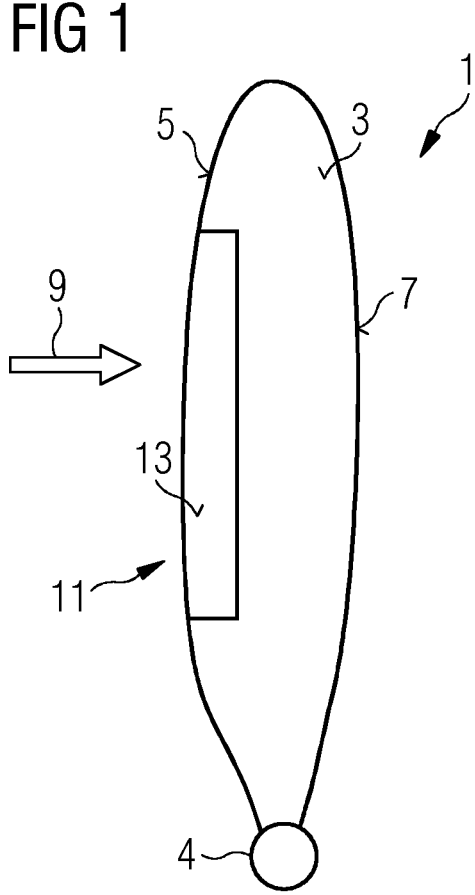

| | | | |
|---|---|---|---|
| 2012/0141271 A1* | 6/2012 | Southwick | F03D 7/0232 416/1 |
| 2013/0020444 A1 | 1/2013 | Balzer | |
| 2019/0186463 A1 | 6/2019 | Akay et al. | |
| 2020/0011290 A1 | 1/2020 | Akay et al. | |
| 2020/0011292 A1 | 1/2020 | Akay et al. | |

FOREIGN PATENT DOCUMENTS

| | | |
|---|---|---|
| WO | 2011/026495 A2 | 3/2011 |
| WO | 2018/041420 A1 | 3/2018 |
| WO | 2018/162100 A1 | 9/2018 |
| WO | 2018/162102 A1 | 9/2018 |

* cited by examiner

QUICK ADAPTATION OF WIND TURBINE BLADE FLOW REGULATION

CROSS-REFERENCE TO RELATED APPLICATIONS

This application claims priority to PCT Application No. PCT/EP2019/078924, having a filing date of Oct. 23, 2019, which is based on EP Application No. 18212400.8, having a filing date of Dec. 13, 2018, the entire contents both of which are hereby incorporated by reference.

FIELD OF TECHNOLOGY

The following relates to an arrangement for releasing fluid from a deformable container adapted to modify a state of an adaptable flow regulating device of a wind turbine rotor blade. Furthermore, the following relates to an adaptable flow regulating device, such as a spoiler or a flap, and further relates to a wind turbine rotor blade.

BACKGROUND

A wind turbine rotor blade may have installed an adaptable flow regulating device on its surface, such as a spoiler or flap. The spoiler may be adjusted in different states of the spoiler. The state of the spoiler may relate to a protrusion height and/or tilt angle by which the spoiler extends from or is angularly tilted relative to other surface portions of the rotor blade. In general, a flow regulating device may be considered to comprise a device which is capable of, in certain conditions, enhancing the lift coefficient of the airfoil section, for example by increasing the level of energy of the boundary layer of the rotor blade.

EP 1 623 111 B1 discloses a wind turbine blade including adjustable lift-regulating means arranged on or at the surface of the wind turbine blade and extending in the longitudinal direction of the blade and an activation means by which the lift-regulating means can be adjusted and thus alter the aerodynamic properties of the blade. The lift-regulating means comprise one or more flexible flaps.

U.S. Pat. No. 8,851,840 B2 discloses a wind turbine blade comprising a blade body and a device for modifying the aerodynamic surface or shape of the blade, wherein a pneumatic actuator controls the position and/or movement of the device, wherein a pressure chamber positioned within the blade body is present. The pressure chamber may be pressurized thereby changing the state of the device, thereby modifying the aerodynamic surface or shape of the blade.

U.S. Pat. No. 5,106,265 A discloses a wind turbine wing comprising a pneumatically actuated spoiler movable perpendicular to an airstream.

WO 2018/041420 disclose a rotor blade comprising an aerodynamic device for influencing the air flow flowing from the leading edge section of the rotor blade to the trailing edge section of the rotor blade, wherein the aerodynamic device is mounted at a surface of the rotor blade and comprises a pneumatic or hydraulic actuator, such as a hose or a cavity of which the volume depends on the pressure of the fluid being present inside the pneumatic or hydraulic actuator.

Conventionally, a state, in particular activation state, of a flow regulating device, such as a spoiler or a flap (installed at the wind turbine rotor blade), may be adjusted using a deformable container, such as a hose or a bag, which can be filled with air to a different degree. Upon filling the deformable container with compressed air, thus upon inflating the deformable container, the container deforms. The deformable container is in contact with a portion of the flow regulating device, such that upon deformation of the container the position and/or orientation and/or tilt of a portion of the flow regulating device changes. Thereby, the position and/or orientation and/or tilt of an airfoil-shaped surface, in particular a flow exposed surface, of the flow regulating device is altered. Upon deflating the deformable container, the flow regulating device may adopt a deactivated state, for example a retracted state.

It has been observed that conventional actuators for an adaptable flow regulating device do not in all situations or circumstances allow fast adaptation of the flow regulating device.

It is thus an aspect of embodiments of the present invention to provide an arrangement for releasing fluid from a deformable container adapted to modify a state of an adaptable flow regulating device which allows reliable and fast adaptation of the adaptable flow regulating device. Furthermore it is an aspect of embodiments of the present invention to provide an adaptable flow regulating device which may be adaptable in a fast and reliable and simple manner.

SUMMARY

An aspect relates to an arrangement for releasing fluid from a deformable container adapted to modify a state of an adaptable flow regulating device of a wind turbine rotor blade, the arrangement comprising: a valve connectable to the container; an exhaust tube connected to the valve, wherein the valve is adjustable to allow fluid communication between a lumen of the container and a lumen of the exhaust tube.

The fluid may for example comprise a gas, in particular air. The deformable container may be configured as a bag and/or a hose or a tube or tubing, in particular made from flexible and deformable material, such as rubber. The deformable container may substantially have a shape of a cylinder. Upon inflating the deformable container, the extent of the container may increase. Thereby, the deformable container may be in contact and may push a portion of the adaptable flow regulating device, in order to change position and/or orientation and/or tilt of an active surface portion (exposed to air flow, for example having an airfoil shape) of the flow regulating device.

The adaptable flow regulating device may for example comprise a spoiler which may in particular be installed at or in a region of a front edge (in particular at a suction side) of a wind turbine blade. In other embodiments, the adaptable flow regulating device may comprise or may be a flap which may be installed at a trailing edge (in particular at the suction side) of the wind turbine rotor blade.

The term "adaptable" may mean that tilt and/or orientation and/or position of an active surface portion (of the flow regulating device) which is exposed to the air flow during normal operation of the wind turbine is adjustable (for example according to at least two different states).

The valve may be configured as a gas valve and may withstand pressures in the range of 0.5 bar to 10 bar. The valve may at least be configured to release fluid which has been filled into the container to flow into or through the exhaust tube, in particular to an outside or to the environment. The valve may be opened or closed. In the closed state of the valve, the fluid (in particular compressed air) contained within the lumen of the container is prohibited from flowing out of the lumen of the container. In a first open state, the fluid contained within the lumen of the container is allowed to flow from the lumen of the container into the exhaust tube and in particular further to the environment. The valve may have a second open state in which for example a compressor is communicatively connected with the lumen of the container such to allow compressed air to be supplied into the lumen of the container.

Conventionally, no exhaust tube may have been provided for exhausting the fluid contained within the deformable container in order to adapt the state of the flow regulating device. Conventionally, the fluid or compressed air has been released directly from the container into the atmosphere, thus without guiding the fluid through the exhaust tube. When the exhaust tube is present, the flow of the fluid exiting from the lumen of the container may be accelerated. Thus, the inflated container may be emptied or at least partially emptied in a faster manner when the exhaust tube is present and guides the fluid out of the lumen of the container. In particular, by providing a relatively long exhaust tube, a fast discharge may be achieved. By extending the exhaust (restricting the expansion volume), a faster "discharge" of the compressed air in the long exhaust may be possible.

Conventionally, the compressed air was released from the container through a small opening into the environment. Thus, conventionally, the air expanded in the three-dimensional volume.

In the case of sound waves, the wave of the sound produced by a person expands over a three-dimensional volume and gets impeded accordingly. If instead a tube is used between a sound generator and a sound receiver, sound vibrations can travel further because less impedance is in the transport channel. Therefore, a longer distance may be achieved.

Conventionally, when no exhaust tube is present which restricts the expansion, the surface is getting larger and larger. In the normal procedure of exhaust, a reverse pressure is expanded into a sphere or a part of a sphere and is expanding with the second power of the distance. According to embodiments of the present invention, when exhausting into the exhaust tube, the surface of the exhaust channel may be constant which means a lower impedance and faster exit. Thus, the exhaust tube providing a restriction of the surface area through which the exhaust fluid is guided, can be used to speed up the exhaust phase of an adaptable flow regulating device. Thereby, multiple systems may be used along the total length of the rotor blade, for example each system having multiple exhaust valves.

According to an embodiment of the present invention, the exhaust tube has a cross sectional area being substantially constant over between 50% and 100% of a length of the exhaust tube. When the cross-sectional area is constant, the speed of the fluid guided through the exhaust tube during deflating the container may substantially be constant. Thereby, a fast deflation of the container may be achieved, resulting in a fast adaptation of the flow regulating device.

According to an embodiment of the present invention, a cross sectional area of the exhaust tube changes equal to or less than between 0% and 10% over the length of the exhaust tube. Thereby, fast deflation times may be achievable.

According to an embodiment of the present invention, a cross sectional area of the exhaust tube is between 1 and 100 cm^2.

The exhaust tube may be arranged partly within a rotor blade and partly outside a rotor blade. The tube may be fixed on the existing structure of the inner blade in a way where the dynamic forces are taken into account.

According to an embodiment of the present invention, a length and a cross sectional area of the exhaust tube are selected such that a volume of the lumen of the exhaust tube substantially equals a working volume of the container. The better the volume of the lumen of the exhaust tube matches the working volume, the faster the release of the fluid from the deformable container may be. The inventor performed experimental studies, measuring the release times of the air in dependence of the volume of the lumen of the exhaust tube. The experiments proved the beneficial effect of accelerating the release time or deflating time due to the presence of the exhaust tube which restricts the cross-sectional surface area of the exiting fluid.

According to an embodiment of the present invention, the working volume of the container is the difference between inner volumes of the lumen of the container in a nominally inflated state and a nominally deflated state, corresponding to a fully activated state and fully deactivated state of the flow regulating device, the working volume being in particular between ¼ and ½ of the volume of the lumen of the container in the nominally inflated state.

Thus, in order to reach a fully activated state starting from the fully deactivated state of the flow regulating device, the working volume of the container is to be additionally filled with the fluid. For achieving a deactivated state of the flow regulating device starting from a nominally inflated or fully activated state, the total volume of the lumen of the container needs to be diminished by the working volume. The working volume may for example also be considered as breathing volume by which the container breathes upon toggling between an activated state and a deactivated state of the flow regulating device.

According to an embodiment of the present invention, the exhaust tube is made of a flexible or solid material and/or the cross-sectional shape of the exhaust tube is oval or circular or rectangular. Thereby, the exhaust tube may be manufactured in a simple manner using conventionally available materials.

In particular, the exhaust tube may substantially be not deformable, at least not regarding the cross-sectional area which should be desirably constant along the longitudinal extent or direction of the exhaust tube. The exhaust tube may in the longitudinal direction substantially be straight or may comprise one or more curved sections. The exhaust tube may be a standard tube, it may be advantageous to have a little larger diameter on the exhaust under certain conditions. The system can be tuned to the best performance.

According to an embodiment of the present invention, the exhaust tube comprises at an end not connected to the valve an exhaust tube outlet exposed to the environment, in particular atmosphere. The exhaust tube outlet may have a substantially cross-sectional area equal to the cross-sectional area of the lumen of the exhaust tube. In other embodiments, the exhaust tube outlet may comprise for example a nozzle or a cone.

According to an embodiment of the present invention, the fluid in the nominally inflated container is pressurized having pressure between 0.5 and 10 bar. The fluid may comprise air, in particular compressed air. Thereby, safety requirements may be met. Furthermore, conventional equipment may be utilized. For example, a compressor may generate compressed air.

According to an embodiment of the present invention it is provided an adaptable flow regulating device, in particular spoiler or flap, for a wind turbine rotor blade, comprising: an airfoil surface to be exposed to an air flow during rotation of the rotor blade; a deformable container coupled to the airfoil surface and adapted to be deformed by inflating or deflating it using fluid, thereby changing position and/or orientation and/or tilt of the airfoil surface for modifying a state of the adaptable flow regulating device; and an arrangement according to one of the preceding embodiments.

The airfoil surface is a portion of the flow regulating device which is intended to be exposed to be in interaction with the air flow during rotation of the rotor blade. The airfoil surface is intended to directly change the characteristics of the air flow, in particular depending on the activation state of the flow regulating device. In particular, upon deflation or inflation the deformable container, the position and/or tilt and/or orientation of the airfoil surface (in particular relative to other surface portions of the outer surface of the rotor blade) may change. When the arrangement according to embodiments of the present invention is utilized, the adaptation of the flow regulating device may be performed in a faster manner. Thereby, a control of the wind turbine may be performed in a faster manner, for example responding to external conditions, such as wind speed, wind direction, etc.

According to an embodiment of the present invention, the adaptable flow regulating device further comprises a compressor connected to the valve and adapted to generate compressed fluid in a lumen of the compressor, wherein the valve is further adjustable to selectively allow fluid communication between the lumen of the container and the lumen of the compressor.

According to a further embodiment of the present invention it is provided a wind turbine rotor blade, comprising: a rotor blade surface; and at least one adaptable flow regulating device according to the preceding embodiment, installed at the rotor blade such that the airfoil surface of the spoiler protrudes from the rotor blade surface at least in the activated state.

The rotor blade surface may be an outer surface of the rotor blade which is exposed to the air flow during normal operation of the wind turbine. The rotor blade surface may comprise a suction surface and a pressure surface. The adaptable flow regulating device may be attached or mounted at a portion of the rotor blade surface. In particular, plural adaptable flow regulating devices may be mounted at different portions of the rotor blade surface, such as along a longitudinal direction of the rotor blade. In the deactivated state, the flow regulating device may not change at all or may change only to a small degree the air flow characteristics around or close to the rotor blade surface. In the activated state of the flow regulating device, the air flow characteristics may be altered to be maximally different from the flow characteristics in the deactivated state.

According to a further embodiment of the present invention it is provided a method of releasing fluid from a deformable container adapted to modify a state of an adaptable flow regulating device of a wind turbine rotor blade, the method comprising: opening a valve connected to the container to allow fluid communication between a lumen (18, 18') of the container and a lumen of an exhaust tube connected to the valve.

I should be understood that features individually or in any combination described or applied to an arrangement for releasing fluid from a deformable container adapted to modify a state of an adaptable flow regulating device of a wind turbine rotor blade also apply, individually or in any combination, to a method of releasing fluid from a deformable container adapted to modify a state of an adaptable flow regulating device of a wind turbine rotor blade according to an embodiment of the present invention and vice versa.

The aspects defined above and further aspects of embodiments of the present invention are apparent from the examples of embodiment to be described hereinafter and are explained with reference to the examples of embodiment. The embodiments of the invention will be described in more detail hereinafter with reference to examples of embodiment but to which embodiments of the invention is not limited.

BRIEF DESCRIPTION

Figure 2:
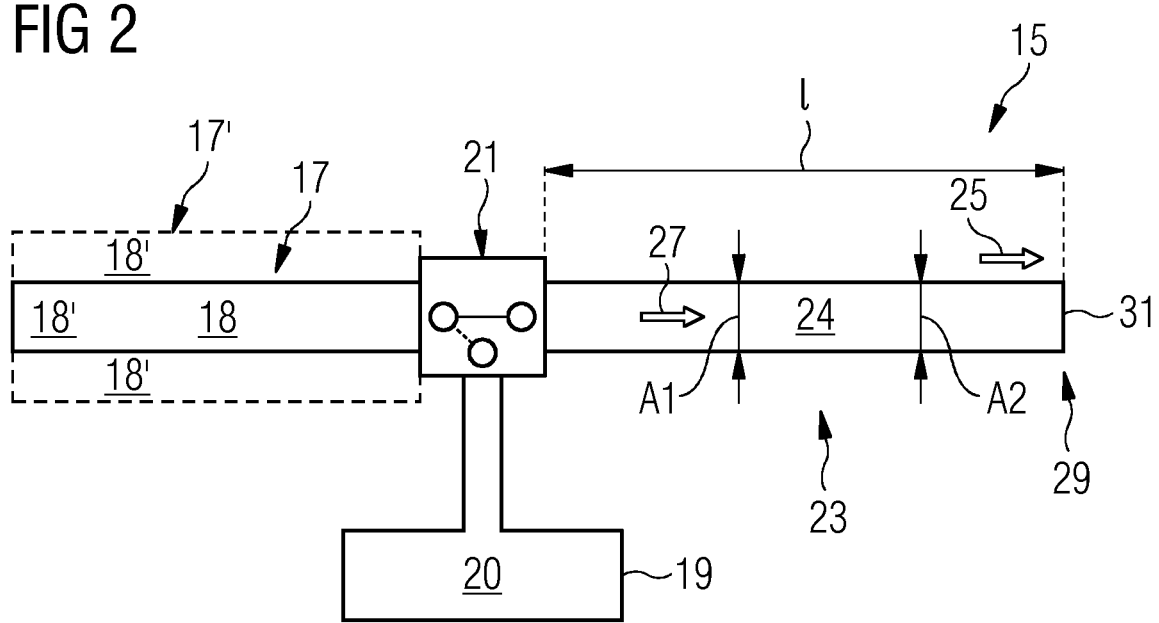

Some of the embodiments will be described in detail, with reference to the following figures, wherein like designations denote like members, wherein:

FIG. 1 schematically illustrates a wind turbine rotor blade according to an embodiment of the present invention which comprises an adaptable flow regulating device according to an embodiment of the present invention; and FIG. 2 schematically illustrates an arrangement for releasing fluid from a deformable container according to an embodiment of the present invention which may for example be comprised in the rotor blade illustrated in FIG. 1.

DETAILED DESCRIPTION

The illustration in the drawings is in schematic form.

The rotor blade 1 for a wind turbine illustrated in FIG. 1 comprises a rotor blade surface 3 which is exposed to the air flow during normal operation of the rotor blade involving rotation around a rotation axis 4 of a wind turbine. In particular, the rotor blade 1 comprises a front edge 5 and a rear (or trailing) edge 7 representing upstream edge and downstream edge with respect to a wind direction 9.

The rotor blade 1 further comprises at least one adaptable flow regulating device 11 according to an embodiment of the present invention. The flow regulating device 11 is in the illustrated embodiment a spoiler which is installed for example at a suction side surface close to the front edge 5 of the rotor blade 1. The spoiler 11 comprises or in general the adaptable flow regulating device 11 comprises an airfoil surface 13 to be exposed to the air flow 9 during rotation of the rotor blade 1.

The adaptable flow regulating device 11 further comprises an arrangement 15 for releasing fluid from a deformable container adapted to modify a state of the adaptable flow regulating device 11 according to an embodiment of the present invention which is schematically illustrated and labelled with reference sign 15 in FIG. 2 together with a deformable container 17 and a compressor 19.

The illustration in FIG. 2 is schematic. The arrangement 15 for releasing fluid from a deformable container 17 to modify a state of the adaptable flow regulating device (for example flow regulating device 11 illustrated in FIG. 1) comprises a valve 21 which is connectable and in particular connected to the container 17. The arrangement 15 further comprises an exhaust tube 23 connected to the valve 21, wherein the valve 21 is adjustable to allow fluid communication between a lumen 18 of the container 17 and a lumen 24 of the exhaust tube 23.

The exhaust tube (or pipe) 23 has the largest extension in a longitudinal direction 25, substantially corresponding to an exhaust flow direction 27 of fluid when it is expelled or exhausted through the exhaust tube 23 from the lumen 18 of the container 17. The exhaust pipe 23 has, perpendicular to the exhaust flow direction 27, a cross sectional area which is denoted with A1, A2 in FIG. 2 which may be substantially constant along the length of the exhaust tube 23, i.e., in particular along the exhaust flow direction 27 or the longitudinal direction 25 of the exhaust tube. In particular, the cross-sectional areas A1 and A2 at different positions along the longitudinal direction 25 of the exhaust tube may change less than 10%, for example.

In the illustrated example, the exhaust tube 23 has a length 1 and may have a circular or rectangular or oval cross section.

The volume of the lumen 24 of the exhaust pipe 23 substantially matches a working volume of the lumen of the deformable container. Thus, length 1 and cross-sectional area A are selected and adjusted accordingly. The solid lines in FIG. 1 illustrate the situation, when the deformable container 17 is in a nominally deflated state, while the dashed lines illustrate the deformable container 17' when in the nominally inflated state. The nominally inflated state may correspond to a fully activated state of the adaptable flow regulating device 11. The nominally deflated state of the deformable container 17 may correspond to a fully deactivated state of the flow regulating device 11.

The volume 24 of the exhaust tube 23 may substantially match or equal to the working volume of the deformable container 17 which can be obtained by subtracting the volume 18' of the deformable container 17' in the nominally inflated state, i.e., indicated with the dashed lines and labelled with reference sign 17' from the volume 18 of the deflated deformable container 17.

The exhaust tube 23 comprises at an end 29 which is not connected to the valve 21 an exhaust tube outlet 31 which is exposed to the environment, in particular atmosphere. The exhaust tube outlet 31 may have a particular shape depending on the application. In particular, the exhaust tube merely ends at a particular position without changing its cross-sectional area.

The deformable container 17, 17' illustrated in FIG. 2 is in contact with a portion of the flow regulating device 11 illustrated in FIG. 1 such that for different inflation or deflation states of the container 17, 17', the adaptable flow regulating device 11 adopts an activated or a deactivated state. When the deformable container is in the nominally inflated state (labelled with reference sign 17') it may be deflated by setting the valve 21 in a first opening state which allows fluid communication between the lumen 18' of the container 17' and the lumen 24 of the exhaust tube 23.

For inflating the container 17 from the deflated state to the inflated state 17', the compressor 19 is provided which is also connected to the valve 21. The valve 21 may be set into a second open state in which fluid communication between the lumen 18 of the container 17 and a lumen 20 of the compressor 19 is established.

When exhausting into an exhaust tube, the surface of the source channel may be constant which means a lower impedance and faster exit. In contrast, in a normal way of exhaust, a reverse pressure is expanding into a sphere/part of a sphere and is expanding as the second power of the distance.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An arrangement for releasing fluid from a deformable container adapted to modify a state of an adaptable flow regulating device of a wind turbine rotor blade, the arrangement comprising:
    a valve connectable to the container;
    an exhaust tube connected to the valve, wherein the valve is adjustable to allow fluid communication between a lumen of the container and a lumen of the exhaust tube;
    wherein a length and a profile of a cross sectional area of the exhaust tube are selected such that a volume of the lumen of the exhaust tube substantially equals a working volume of the container, and wherein the exhaust tube comprises at an end not connected to the valve an exhaust tube outlet exposed to the environment or to atmosphere.

2. The arrangement according to claim 1, wherein the exhaust tube has a cross sectional area being substantially constant over between 50% and 100% of a length of the exhaust tube.

3. The arrangement according to claim 1, wherein a cross sectional area of the exhaust tube changes between 0% and 10% over a length of the exhaust tube.

4. The arrangement according to claim 1, wherein a cross sectional area of the exhaust tube is between 1 and 100 cm$^2$.

5. The arrangement according to claim 1, the working volume of the container being the difference between inner volumes of the lumen of the container in a nominal inflated state and a nominal deflated state, corresponding to a fully activated state and fully deactivated state of the flow regulating device,
    the working volume being between ¼ and ½ of the volume of the lumen of the container in the nominal inflated state.

6. The arrangement according to claim 1, wherein the exhaust tube is made of a flexible or solid material and/or a cross sectional shape is oval or circular or rectangular.

7. The arrangement according to claim 1, wherein the fluid in the nominal inflated container is pressurized having pressure between 0.5 and 10 bar.

8. The arrangement according to claim 1, wherein the fluid comprises air or compressed air.

9. An adaptable flow regulating device, for a wind turbine rotor blade, comprising:
    an airfoil surface to be exposed to an air flow during rotation of the rotor blade;
    a deformable container coupled to the airfoil surface and adapted to be deformed by inflating or deflating it using fluid, thereby changing position and/or orientation and/or tilt of the airfoil surface for modifying a state of the adaptable flow regulating device; and
    an arrangement having a valve connectable to the deformable container and an exhaust tube connected to the valve, wherein the valve is adjustable to allow communication of the fluid between a lumen of the deformable container and a lumen of the exhaust tube, wherein a length and a profile of a cross sectional area of the exhaust tube are selected such that a volume of the lumen of the exhaust tube substantially equals a working volume of the deformable container, and wherein the exhaust tube comprises at an end not connected to the valve an exhaust tube outlet exposed to the environment or to atmosphere.

10. The adaptable flow regulating device according to claim 9, further comprising:
    a compressor connected to the valve and adapted to generate compressed fluid in a lumen of the compressor, wherein the valve is further adjustable to selectively allow fluid communication between the lumen of the container and the lumen of the compressor.

11. A wind turbine rotor blade, comprising:
   a rotor blade surface; and
   at least one adaptable flow regulating device according to claim 10, installed at the rotor blade such that the airfoil surface of the flow regulating device protrudes from the rotor blade surface at least in the activated state.

12. A method of releasing fluid from a deformable container adapted to modify a state of an adaptable flow regulating device of a wind turbine rotor blade, the method comprising:
   opening a valve connected to the deformable container to allow fluid communication between a lumen of the deformable container and a lumen of an exhaust tube connected to the valve, wherein a length and a profile of a cross sectional area of the exhaust tube are selected such that a volume of the lumen of the exhaust tube substantially equals a working volume of the deformable container, and wherein the exhaust tube comprises at an end not connected to the valve an exhaust tube outlet exposed to the environment or to atmosphere.

* * * * *